E. D. PARKER.

KNOTTER.

APPLICATION FILED SEPT. 9, 1918.

Reissued Dec. 9, 1919.

14,767.

2 SHEETS—SHEET 1.

Inventor
Earle D. Parker
By Ruthven L. Miller
Atty

E. D. PARKER.

KNOTTER.

APPLICATION FILED SEPT. 9, 1918.

Reissued Dec. 9, 1919.

14,767.

2 SHEETS—SHEET 2.

Inventor
Earle D. Parker
By Luther L. Millen
Atty

UNITED STATES PATENT OFFICE.

EARLE D. PARKER, OF ROCKFORD, ILLINOIS, ASSIGNOR TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

KNOTTER.

14,767. Specification of Reissued Letters Patent. Reissued Dec. 9, 1919.

Original No. 1,241,758, dated October 2, 1917, Serial No. 772,439, filed June 7, 1913. Application for reissue filed September 9, 1918. Serial No. 253,340.

*To all whom it may concern:*

Be it known that I, EARLE D. PARKER, a citizen of the United States, residing at Rockford, in the county of Winnebago and State of Illinois, have invented certain new and useful Improvements in Knotters, of which the following is a specification.

In the spooling and other operations practised in textile mills, it is necesary to unite threads by means of knots, and it is desirable that the knots shall be small and flat, in order that the knots shall not cause trouble and waste in the subsequent operations to which the threads are subjected.

This invention relates to mechanisms for tying small, flat knots, such as the so-called "weaver's knot".

The primary object of the invention is to produce a simple knotter capable of tying a weaver's knot. A subordinate object is to produce a mechanism which may, if desired, be made sufficiently small and light to be carried on the hand of the operative without inconvenience or fatigue, and sufficiently rugged to withstand the hard usage which a hand implement is likely to receive.

Figure 1:
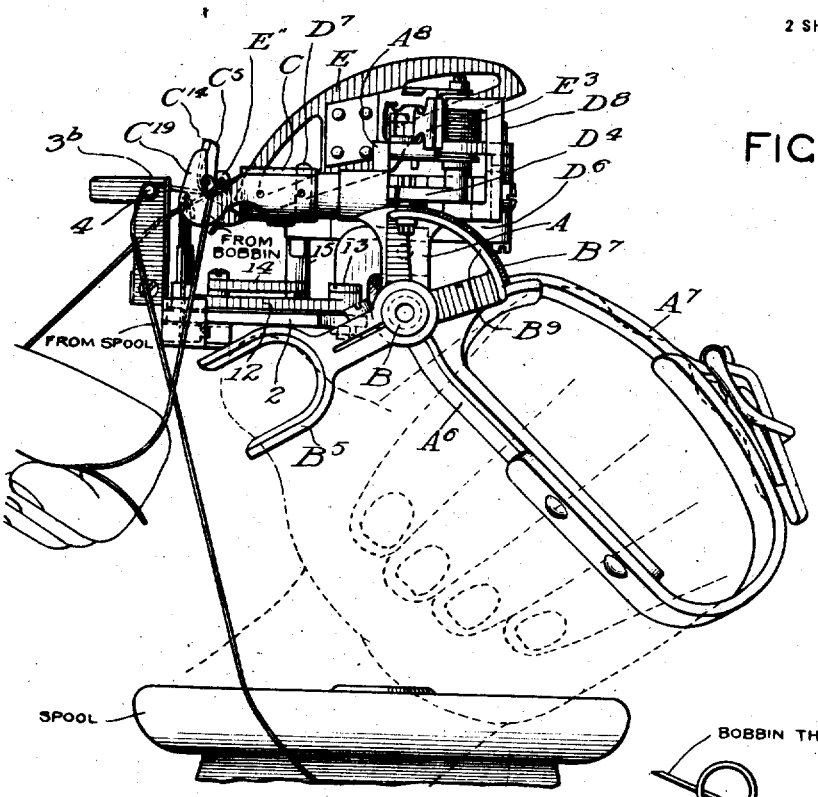
Figure 3:
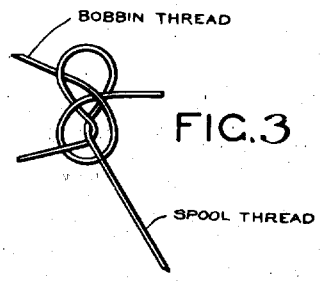
Figure 2:
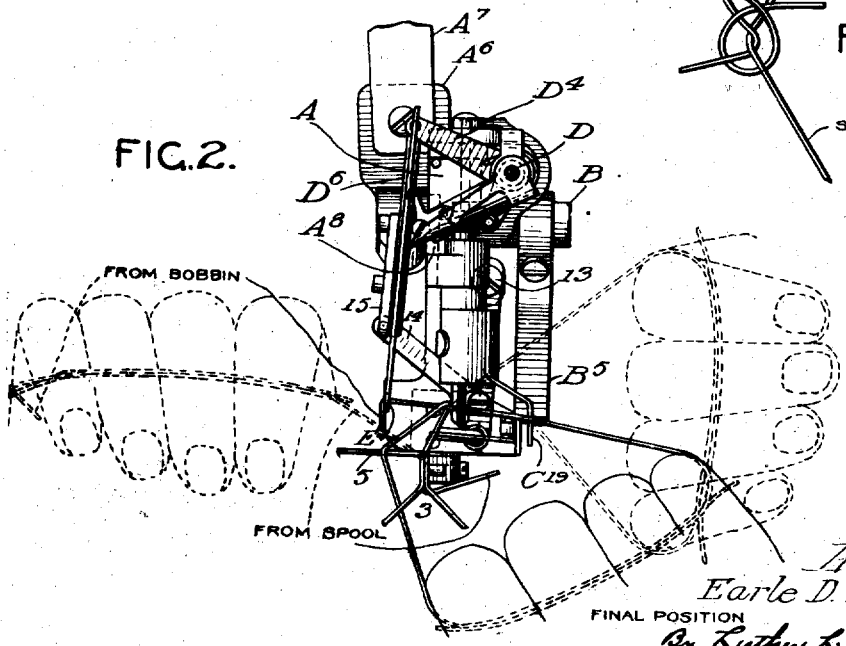
Figure 4:
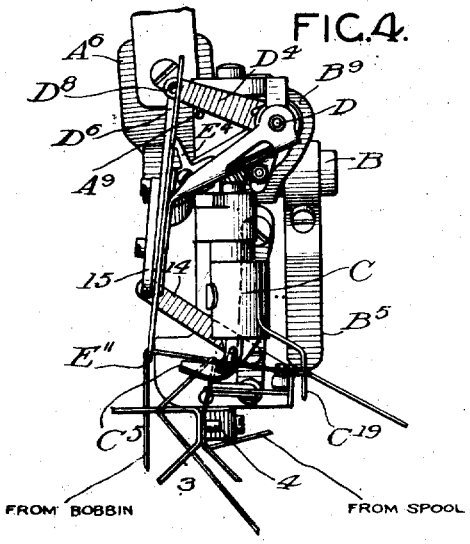
Figure 5:
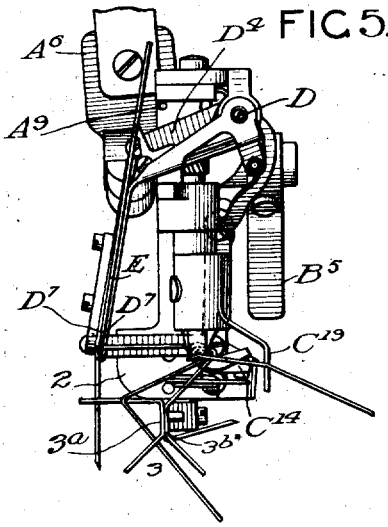
Figure 8:
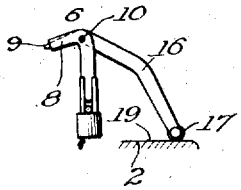
Figure 7:
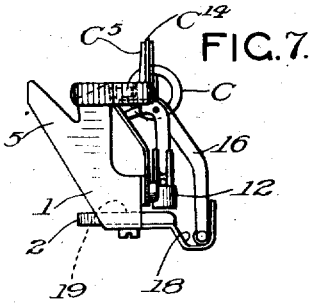
Figure 6:
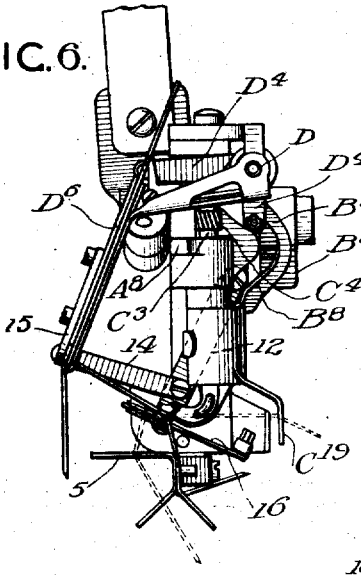
Figure 9:
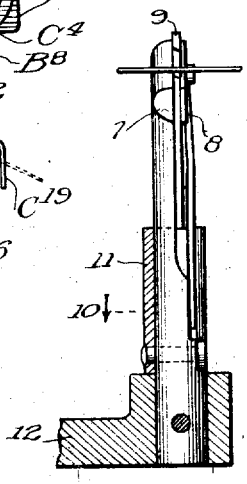
Figure 10:
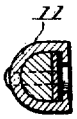
Figure 11:
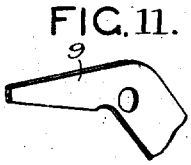
Figure 12:
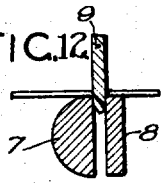

In the accompanying drawings, Figure 1 is a side elevation of one form of knot-tying implement embodying my invention and illustrating the manner in which it is used. Fig. 2 is a fragmental plan view showing how the threads are placed in operative relation to the implement. Fig. 3 is a diagrammatic representation of a knot tied by means of the implement. In Figs. 1 and 2 the parts of the implement are shown in the initial position. Fig. 4 is a fragmental plan view showing the parts in the position occupied after the rotary tying bill has made a quarter-revolution. Fig. 5 is a view similar to Fig. 4, but showing the positions occupied when the tying bill has completed three-fourths of a revolution. Fig. 6 illustrates the positions occupied by the parts when the tying bill has made one and a quarter revolutions. Fig. 7 is a partial front view. Fig. 8 is a view of a shearing and clamping device comprised in the mechanism. Fig. 9 is a view of said device, upon an enlarged scale. Fig. 10 is a sectional view taken in the plane of dotted line 10 of Fig. 9. Fig. 11 is a perspective view of the movable shearing and clamping jaw of said device. Fig. 12 is a sectional view of the shearing and clamping device showing the action thereof upon a thread.

The invention is herein shown as embodied in a hand implement adapted for use in uniting two threads, as, for example, a thread from a bobbin and a thread from a spool. The implement comprises a tying bill for forming the loops of the knot and for shearing one of the threads; means for tightening the loops of the knot and stripping the knot from the tying bill; a device for shearing the other thread and assisting to strip the knot from the tying bill; and guides for properly positioning the threads with relation to the mechanism.

While my invention is susceptible of embodiment in various forms, I have herein shown the mechanism as arranged to be supported upon the hand of the operative by means of a loop similar to the one shown in Patent No. 755,110, dated March 22, 1904, said loop comprising a handle $A^6$ and a strap $A^7$. A standard A is rigidly fixed to the handle $A^6$ and is provided with bearings for the shaft $C^3$ (Fig. 6) of the tying bill $C^5$. Said tying bill is provided with a pivoted shearing and clamping jaw $C^{14}$ arranged to be moved to open and close the tying bill by means of a cam barrel C. On the shaft $C^3$ is a spiral gear pinion $C^4$ (Fig. 6) that meshes with a spiral gear segment $B^7$ (Fig. 1). Said segment is rotatively mounted upon a stud B which is fixed to the handle $A^6$. Fixed to the hub of the gear segment is a thumb for $B^5$ by means of which the segment may be oscillated to rotate the tying bill in one direction through one and a half revolutions and in the opposite direction to the initial position.

The means herein shown for tightening the loops of the knot and stripping the knot from the tying bill comprises a thread-holding arm E pivoted to swing on the axis D. The forward end of said arm is in form of a hook $E^{11}$ to receive one of the threads to be tied, namely, the thread extending from the bobbin. A coiled spring $E^3$ tends to hold the arm E in its initial position, such position being determined by contact of the arm with a stationary stop $A^8$.

A thread-clamping arm $D^6$, provided at its forward end with two upwardly-extending clamping fingers $D^7$ that lie at opposite sides of the holding arm E, is pivoted at its rear end to one arm of a bell crank $D^4$ that swings on the axis D. The other arm of the bell crank is provided with a roller stud that lies in a cam groove $B^8$ (Fig. 6) formed in an arcuate flange $B^9$ which is fixed with relation to the gear segment $B^7$. The shape of the cam groove $B^8$ is such as to cause the bell crank $D^4$ to swing back and forth with each stroke of the thumb-fork $B^5$. During the operating (*i. e.*, downward) stroke of the thumb fork, the arm $D^6$ is advanced so as to cause the fingers $D^7$ to clamp the thread lying in the hook $E^{11}$ of the arm E. As the arm $D^6$ advances, a spring latch $E^4$ (Fig. 4) on the arm E engages a stud $D^8$ on the bell crank $D^4$, so that when the movement of the bell crank is reversed the arm E is caused to move with the bell crank and the arm $D^6$ (as in Fig. 6), in which movement the said arms swing laterally away from the tying bill to tighten the loops and strip the knot off the tying bill. As the thumb fork completes its operative stroke, the spring latch $E^4$ is disengaged from the pin $D^8$ by means of a stop pin $A^9$.

At the side of the tying bill, opposite to the arms E and $D^6$, is a stationary thread guide $C^{19}$ for the thread extending from the bobbin.

All the parts thus far described are substantially identical with the parts bearing corresponding reference characters in the before-mentioned patent (with an exception to be presently noted), but I would have it understood that my invention is not limited to the form and arrangement of the parts as just described.

The position of the hook $E^{11}$ with reference to the tying bill is such that the tying bill in its revolution cannot engage the portion of the bobbin thread that extends between said hook and bill.

For supporting the thread extending from the spool, suitable means may be provided, as, for example, a bracket 1 (Fig. 7) fixed to a frame member 2, said frame member being rigidly fixed to the standard A. Upon the bracket 1 is a thread clamp 3 which may consist, as herein shown, of a jaw $3^a$ fixed to said bracket, and a co-acting spring jaw $3^b$ attached to the bracket, said jaws having flaring forward ends to facilitate the insertion of the thread into the clamp. A pin 4 fixed to the jaw $3^a$ and extending through a perforation in the jaw $3^b$ limits the extent to which the thread may be inserted into the clamp. The clamp 3 is located forwardly of the tying bill $C^5$. The bracket 1 is notched to form a guide 5 for the thread extending from the spool. The clamp 3 may also be termed a guide or support for the spool thread.

The tying bill $C^5$, in addition to forming the loops of the knot, serves to shear or trim off the waste end of the thread extending from the bobbin. The waste end of the thread coming from the spool is cut off by a device 6 (Fig. 8) which, in the form herein shown, comprises a clamping jaw 7, a spring shearing jaw 8, and an intermediate shearing and clamping jaw 9, the latter being pivoted upon a pivot pin 10. As indicated in Fig. 12, the adjacent edges of the jaws 8 and 9 are sharpened to shear the thread, while the adjacent edges of the jaws 7 and 9 are beveled or rounded to clamp the thread-end leading to the tying bill. The jaw 8 and its attaching shank are substantially similar to the bill spring $C^7$ described in the patent referred to. Said shank is removably held in place by a sleeve 11.

The guides 3 and 5 are spaced apart, and the bottom of the notch of the guide 5 is below the horizontal plane of the pin 4, so that the portion of the spool thread extending between the tying bill and the guide 5 is below the portion extending between the tying bill and the guide 3.

Any suitable means may be provided for advancing the device 6 to grasp the strand extending between the tying bill and the guide 5. Herein I have shown said device as fixed upon an arm 12 which is pivoted at 13 to the frame member 2. A link 14 connects the forward portion of the arm 12 with a member 15 fixed to the arm $D^6$. Thus, when the arms E and $D^6$ swing outwardly to tighten and strip the knot, the device 6 is advanced to grasp the portion of the spool thread which is to be severed, namely, the portion extending between the knot and the guide 5.

The jaw 9 may be swung to shear, clamp and release the thread by any suitable means. Herein I have shown the jaw 9 as provided with an arm 16 bearing an anti-friction roller 17, which roller runs in contact with a cam surface consisting of a depression 18 and a dwell 19. When the roller 17 is in the depression 18, the jaw 9 is in the open position. As the roller passes out of said depression, the jaw 9 is moved to shear and clamp the thread, the clamping action continuing while the roller is upon the dwell 19.

Assuming the implement to be mounted upon the left hand of a spooler tender and the mechanism to be in initial position (*i. e.*, in the position shown in Figs. 1 and 2), the threads are manipulated as follows:

When it is desired to unite the end of the thread upon a bobbin to the end of the thread upon a spool, the operative lays the end of the bobbin thread across the palm of the right hand, the loose end projecting beyond the thumb, and the hand being held palm side up. The rotation of the spool is then stopped by placing the left hand on the top of the spool, and the end of the spool thread found and placed in the palm of the right hand, the loose end projecting slightly beyond the little finger. The right hand, being still held palm side up, is raised and the spool thread placed in the clamp 3. The right hand is then turned toward the left to lay the bobbin thread in the hook $E^{11}$ and behind the tying bill and in the guide $C^{19}$. The right hand is then turned farther toward the left and brought forward, thus carrying the spool thread over the bobbin thread and down into the guide 5. The bobbin thread now extends through the hook $E^{11}$, behind the tying bill, and into the guide $C^{19}$, and the spool thread is doubled over the bobbin thread, both strands of the spool thread lying at the same side of the tying bill, namely, at the side toward which the tying bill turns when beginning its revolution. The operative then depresses the thumb fork $B^5$ with the thumb of the left hand. As soon as the tying bill and the device 6 have clamped the threads, the operative drops the loose ends, takes hold of the united threads, draws said threads out of the clamp 3 and removes her hand from the spool.

The operation of the mechanism may be briefly described as follows:

Depression of the thumb fork $B^5$ causes the tying bill to rotate counter-clockwise, thereby engaging the doubled spool thread and coiling the threads around the bill. By the time the tying bill has reached the position shown in Fig. 5, the bill has been opened so that in the continuing rotation of the bill it grasps the portion of the bobbin thread which extends between the tying bill and the guide $C^{19}$. During the ensuing half revolution, the bobbin thread is sheared and clamped by the tying bill, and the device 6 is advanced to grasp and shear the portion of the spool thread which extends between the tying bill and the guide 5. The bobbin thread has also been clamped by the fingers $D^7$ and hook $E^{11}$, and the arm E and $D^6$ have swung laterally, thus pulling the loops of the knot onto the point of the tying bill. As the arms E and $D^6$ and the device 6 continue to move laterally, the loops of the knot are pulled off the tying bill and drawn tight, and the thread end finally pulled out of the tying bill. The end clamped in the device 6 is released as said device is moved with the arm E into the initial position by the spring $E^3$. The operative then swings the thumb fork $B^5$ up to the initial position, thereby restoring the parts of the mechanism to their initial positions.

The invention is not limited to mechanisms intended to be mounted upon the hand of the operative.

I claim as my invention:

1. In a knot-tying mechanism, in combination, a rotary tying bill; means for supporting a thread extending across the tying bill, said bill being adapted to shear and clamp said thread; means for supporting a thread which is doubled over the other thread; a shear for severing a portion of said doubled thread; means for revolving the tying bill against the doubled thread, the other thread being thereafter caught by the tying bill and sheared and clamped; and means for actuating the shear.

2. In a knot-tying mechanism, in combination, a rotary tying bill; means for supporting a thread extending across the tying bill, said bill being adapted to shear and clamp said thread; two thread guides for supporting a thread which is doubled over the other thread, said guides being spaced apart so as to support the strands of the doubled thread at an angle to each other; means for shearing one of said strands of the doubled thread; and means for actuating the tying bill and the shearing means.

3. In a knot-tying mechanism, in combination, a rotary tying bill; an oscillatory thread-holding arm adapted to clamp the thread and move away from the tying bill to tighten the knot and strip the thread from the tying bill; means for supporting a thread which is doubled over the other thread; means for shearing a portion of said doubled thread; and means for rotating said tying bill and for moving said arm, and for actuating said shearing means.

4. In a knot-tying mechanism, in combination, a rotary tying bill; means for supporting a thread extending across the tying bill, said bill being adapted to shear and clamp said thread; two thread guides for supporting a thread which is doubled over the other thread, one of said guides being below the other; means adapted to shear the strand that lies in said lower guide; and means for actuating the tying bill and the shearing means.

5. In a knot-tying mechanism, in combination, a rotary shaft; a tying bill on said shaft; means for supporting a thread extending across the tying bill, said bill being adapted to shear and clamp said thread; two thread guides for supporting a thread which is doubled over the other thread, one of said guides being in the horizontal plane of the tying bill shaft, and the other guide being below said plane; means adapted to shear the strand held by the lower guide; and means for actuating said tying bill shaft and said shearing means.

6. In a knot-tying mechanism, in combination, a rotary shaft; a tying bill at the forward end of said shaft; an oscillatory thread-holding arm having a thread-hook; means coöperating with said thread hook to clamp the thread in said hook, said hook being located so as to support the portion of the thread that extends between the tying bill and said hook behind and beyond the reach of the tying bill; a thread support at the side of the tying bill opposite to said hook; two guides for supporting a thread which is doubled over the other thread; one of said guides being in the horizontal plane of said shaft and above the other guide, said guides for the doubled thread being located forwardly of the tying bill; a device for shearing and clamping the strand extending to the lower guide, said device comprising a plurality of shearing and clamping jaws; means for opening and closing said jaws; means for rotating the tying bill shaft; means for oscillating the thread-holding arm to move said hook away from the tying bill to tighten the knot and strip the thread from the tying bill; and a connection between said arm and said device whereby when the thread-holding arm moves to tighten the knot and strip the thread, said device will be advanced to grasp the strand extending to the lower guide and shear and clamp said strand.

7. In a knot-tying mechanism, in combination, two thread guides, a tying bill located between said guides, a thread clamp and a third thread guide positioned adjacent each other at one side of said tying bill, thread shearing and clamping mechanism adjacent said third guide, and means for operating said bill and said shearing and clamping mechanism.

8. In a knot-tying mechanism, in combination, two thread guides, a rotary tying bill positioned between said guides, said bill comprising thread shearing and clamping means, two other thread guides supported adjacent each other and at one side of said tying bill, said other guides serving to support a thread which is doubled over a thread carried by the first mentioned guides, shearing and clamping means adjacent one of said other guides, means for revolving the tying bill against the doubled thread, the other thread being thereafter caught by the tying bill and sheared and clamped, and means for actuating the second mentioned shearing and clamping means.

9. In a knot-tying machine, in combination, two thread supporting guides, a tying bill located between said guides, said bill being arranged to shear and clamp a thread extending across said guides, two adjacent thread guides located at one side of said bill for supporting a thread which is doubled over the other thread, thread shearing means located adjacent one of said adjacent guides, and means for operating said bill to coil both threads and to sever the first mentioned thread, and for operating the shearing means to sever the other thread.

10. In a knot-tying mechanism, in combination, a thread guide, a thread clamping member coöperating with said guide, a second thread guide, a tying bill located between said guides, said bill being arranged to shear and clamp a thread, a thread clamp and a thread guide adjacent to each other positioned at one side of said bill, thread shearing means adjacent said third guide, and means for operating the first mentioned thread guide and its coöperating clamping member, the tying bill and said shearing means.

11. In a knot-tying mechanism, in combination, a rotary tying bill; two guides for supporting a thread extending across the tying bill, said bill being adapted to shear and clamp said thread, said guides being located at opposite sides of the bill, the guide which is at the side toward which the bill first turns being arranged to hold the thread out of reach of the bill; two guides located forward of the tying bill for supporting a thread which is doubled over the other thread; a shear for severing a portion of said doubled thread; and means for actuating the tying bill and the shear.

12. In a knot-tying mechanism, in combination, a rotary tying bill; two guides for supporting a thread extending across the tying bill, said bill being adapted to shear and clamp said thread, said guides being located at opposite sides of the bill, the guide which is at the side toward which the bill first turns being arranged to hold the thread out of reach of the bill; two thread guides for supporting a thread which is doubled over the other thread, said last mentioned two guides being spaced apart so as to support the strands of the doubled thread at an angle to each other; a shear for severing one of said strands of the doubled thread; and means for actuating the tying bill and the shear.

13. In a knot-tying mechanism, in combination, a rotary tying bill; an oscillatory threadholding arm adapted to clamp the thread and move away from the tying bill to tighten the knot and strip the thread from the tying bill, said arm being located at the side toward which the bill first turns and being arranged to hold the thread out of reach of the bill; a guide for said thread at the opposite side of the bill; means for supporting a thread which is doubled over the other thread; a shear for severing a portion of said doubled thread; and means for rotating said tying bill, for moving said arm, and for actuating said shear.

14. In a knot-tying mechanism, in combination, a rotary tying bill; means for supporting a thread extending across the tying bill, said bill being adapted to shear and clamp said thread; two thread guides for supporting a thread which is doubled over the other thread, said bill being arranged to revolve against said doubled thread, one of said guides being below the other; a shear adapted to advance to grasp and sever the strand that lies in said lower guide; and means for actuating the tying bill and the shear.

15. In a knot-tying mechanism, in combination, a rotary shaft; a tying bill on said shaft; a movable knot-tightener and stripper and a stationary guide for supporting a thread extending across the tying bill, said bill being adapted to shear and clamp the portion of said thread which extends to said guide, two thread guides for supporting a thread which is doubled over the other thread, one of said last mentioned two guides being in the horizontal plane of the tying bill shaft, and the other guide being below said plane; a shear aranged to advance to grasp and sever the strand held by the lower guide; and means for actuating said tying bill shaft and said shear.

16. A knot-tying mechanism having, in combination, a rotary tying bill, a thread guide at one side of said bill, a movable knot-tightener and stripper at the other side of the bill, said knot-tightener and stripper being arranged to support the thread out of reach of the tying bill, two guides located forward of the tying bill for supporting a thread which is doubled over the other thread, a shear for severing a portion of said doubled thread, said shear being connected to move with the knot-tightener and stripper, said shear comprising a movable jaw, and means for actuating said jaw.

17. A knot-tying mechanism having, in combination, a rotary tying bill, a thread guide at one side of said bill, a movable knot-tightener and stripper at the other side of the bill, said knot-tightener and stripper being arranged to support the thread out of reach of the tying bill, means for supporting a thread which is doubled over the other thread, a shear for severing a portion of said doubled thread, said shear being connected to move with the knot-tightener and stripper, said shear comprising a movable jaw, and a cam for actuating said jaw in the movement of the shear.

18. A knot-tying mechanism having, in combination, a rotary tying bill, a guide and a movable knot-tightener and stripper for supporting a thread extending across the tying bill, said bill being arranged to shear and clamp the portion of said thread which extends to said guide, two stationary guides located forward of the tying bill for supporting a thread which is doubled over the other thread, the tying bill being arranged to revolve against the doubled thread, and a shear for severing a portion of said doubled thread.

19. A knot-tying mechanism having, in combination, a rotary tying bill, a guide and a movable knot-tightener and stripper for supporting a thread extending across the tying bill, said bill being arranged to shear and clamp the portion of said thread which extends to said guide, means for supporting a thread which is doubled over the other thread, the tying bill being arranged to revolve against the doubled thread, and a shear for severing a portion of said doubled thread.

20. A knot-tying mechanism having, in combination, a tying bill arranged to revolve against a thread which is doubled over another thread, said bill being arranged to shear and clamp said other thread, a shear for severing a portion of the doubled thread, and a device to strip the threads from the tying bill.

21. In a knot-tying mechanism, guides for supporting two threads, one of which threads is doubled over the other, and mechanism for coiling the doubled thread, grasping the other thread, and shearing both threads.

22. In a knot-tying mechanism, in combination, guides for supporting two threads, one of which threads is doubled over the other, a tying bill for coiling the doubled thread and grasping and shearing the other thread, and a device for shearing one strand of the doubled thread.

In testimony whereof I have hereunto set my hand.

EARLE D. PARKER